United States Patent Office 3,284,137
Patented Nov. 8, 1966

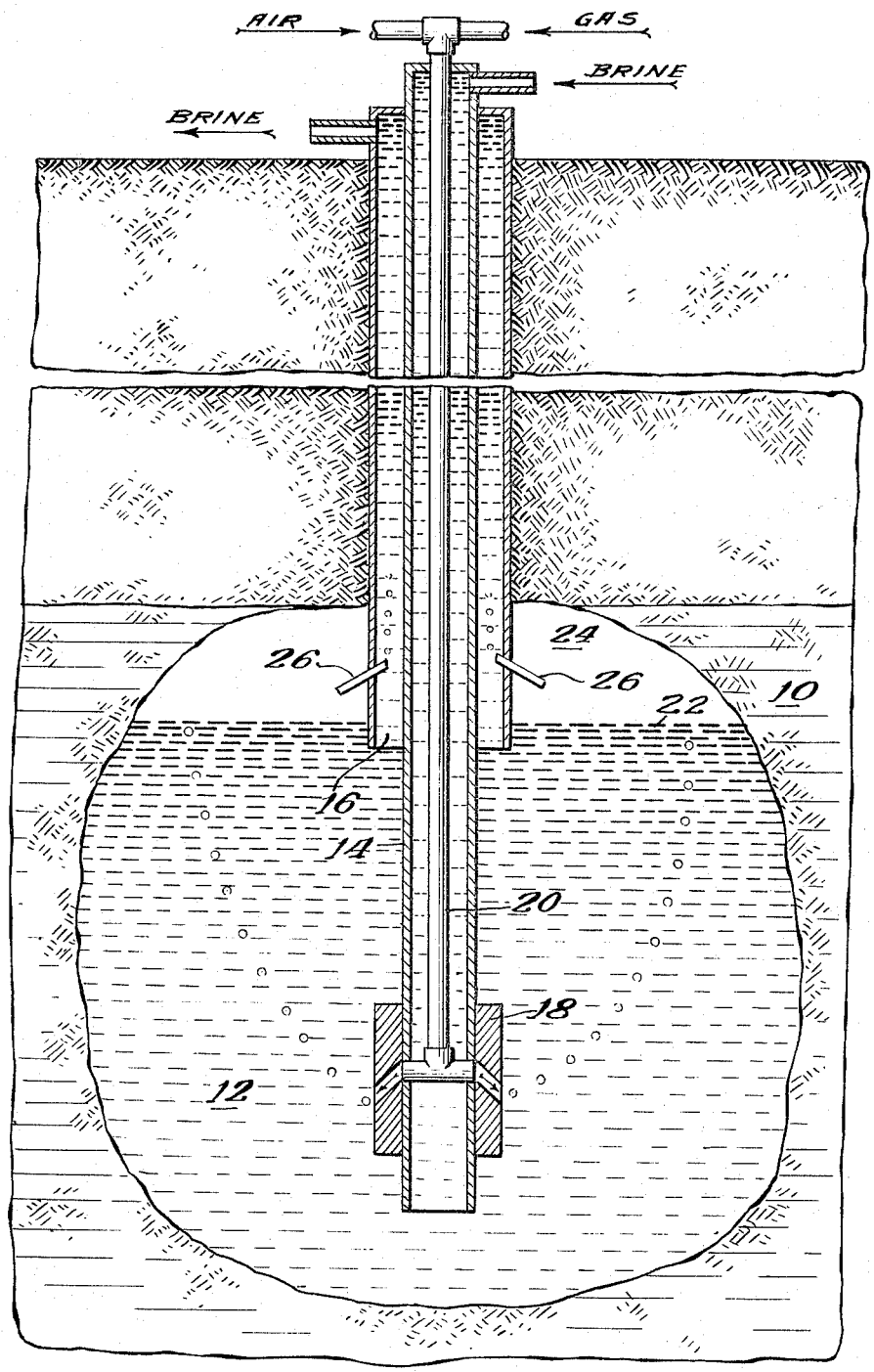

3,284,137
SOLUTION MINING USING SUBSURFACE BURNER
James E. Wolber, Roselle, Ill., assignor to International Minerals & Chemical Corporation, a corporation of New York
Filed Dec. 5, 1963, Ser. No. 328,296
9 Claims. (Cl. 299—5)

This invention relates to a method and apparatus for the solution mining of soluble minerals. More particularly, this invention relates to a method and apparatus by which more efficient heating of the solvent employed in solution mining is provided. In a particular aspect this invention relates to an improved method and apparatus for the recovery of potassium chloride from a subterranean formations by solution mining.

It has been proposed to recover valuable minerals from deeply buried deposits by dissolving the mineral in a solvent, usually water, which is circulated through a well-bore downward from the surface of the earth and into the mineral-bearing deposit. The solvent is then circulated upward through the same or a different well-bore to the surface of the earth. The mineral values are recovered from the enriched solvent by crystallization, which is usually accomplished by evaporating the solvent or by cooling the solvent to a supersaturated condition.

It has usually been preferred to drill a single well into the mineral-bearing deposit, and equip the well to provide two conduits which terminate at vertically spaced points within the formation. An unsaturated solvent is pumped downward through one conduit to dissolve soluble minerals from the formation, and more highly concentrated solvent is forced upward from the formation to the surface of the earth through the other conduit. A portion of the dissolved mineral content of the solvent is then recovered, usually by thermal treatment. As mineral is dissolved and recovered from the subterranean formation, a cavern or cavity is formed. Generally, the mineral to be recovered occurs in rather thin, substantially horizontal strata. It is, therefore, desired that the cavity should grow in a predominantly horizontal direction and that vertical growth upward and downward be limited to the extent possible.

It has heretofore been proposed to employ a heated solvent to recover minerals having higher solubility in hot solvent (such as hot water) than in cold solvent. This has been accomplished by injecting into the subterranean mineral-bearing formation a heated solvent, and recovering from the formation solvent enriched in the soluble mineral. Unfortunately, such methods have not met with great success because the temperature to which a solvent, such as water, can be heated at the surface of the earth is limited by the vapor pressure exerted at elevated temperatures. Heat transferred to the earth results in substantial cooling of the solvent before it reaches the stratum from which mineral is to be recovered. The heat losses in the system, together with the maximum temperature limitation for the injection of the solvent at the surface of the earth, materally restrict the process.

It is an object of this invention to provide an improved process for the recovery of soluble minerals from subterranean formations by circulation of a heated solvent, particularly water.

It is another object of this invention to provide a process for the recovery of soluble minerals by the circulation of solvent in which heat is applied to the solvent within the mineral-bearing stratum.

Yet another object of this invention is to provide an improved recovery process in which a gas cap is maintained in a cavity formed in a subterranean formation, whereby upward growth of the cavity is controlled.

Still another object of this invention is to provide a process for the recovery of soluble minerals from a subterranean formation by the circulation of a solvent in which a combustion-product gas-lift is employed to raise enriched solvent from the subterranean formation.

Briefly, the method of this invention comprises disposing a submerged combustion burner in a cavity in the formation from which soluble minerals are to be recovered, flowing solvent downward into the cavity, heating the solvent by means of the submerged combustion burner, and withdrawing enriched solvent from the cavity to the surface of the earth. Fuel and air are provided to the submerged combustion burner by means of a tubing string which communicates with the surface of the earth. Combustion products of the burner are employed as a gas-lift medium to raise enriched solvent from the cavity to the surface of the earth.

The invention will be described in detail with respect to the drawing, the sole figure of which represents a vertical section through the earth and shows a well-bore communicating with a cavity formed in a subterranean, mineral-bearing formation. Mineral-bearing stratum 10 is rich in water-soluble mineral such as sylvite. Within stratum 10 a cavity 12 has been formed by circulating water downward through internal conduit 14 and upward through external conduit 16. In accordance with this invention, a submerged combustion burner 18, which may be of conventional design, is supported by internal conduit 14. A tubing string 20 communicates submerged combustion burner 18 with the surface of the earth, and provides a path for fuels and air to the burner.

Numerous submerged combustion burner designs have been developed for use in oil wells. Such burners, which are generally supported by a tubing string, are satisfactory for use in accordance with this invention. Particularly preferred are oil-well type submerged combustion burners intended to burn a mixture of natural gas and air, and which are designed to provide a high degree of turbulence in the fluid surrounding the burner. Such turbulence insures rapid heat distribution and avoids the build-up of destructively high temperatures.

Cavity 12 is filled with brine to level 22. A gas cap 24 exists above the brine level 22. Internal conduit 14 is filled with a descending column of unsaturated brine. External conduit 16 contains a rising mixture of enriched brine and gas. The gas comprises the non-condensable combustion products formed in burner 18. Gas is bled into external conduit 16 from gas cap 24 by means of a plurality of orifices 26. The level of the gas on gas cap 24 can be controlled by adjusting the dimensions of orifices 26, by adjusting the volume of combustion products produced in burner 18, and by adjusting the elevation of the internal terminus of orfices 26. The pressure within the gas cap is equal to the pressure exerted by the brine at level 22. It will be understood that the pressure in external conduit 16 is determined by the hydrostatic head of the column of liquid and gas in conduit 16, and by the flow losses occurring in the conduit. Accordingly, the pressure in any point in external conduit 16 above level 22 will be less than the pressure in the gas cap, and a pressure differential, therefore, exists to drive gas from the gas cap into conduit 16.

The ratio of the volume of non-condensing combustion products produced by the burner to the volume of solvent raised through conduit 16 can be adjusted to provide optimum gas-lift conditions by controlling the amounts of air and natural gas fed to the burner. By the term "non-condensing combustion products" is meant that part of the combustion products which remain in the gaseous state at the temperature and pressure existing in the cavity, e.g., the non-aqueous combustion products. This, however, also alters the amount of heat released in the cavity by the burner. It is also possible to control the volume of non-condensing combustion products produced by adjusting the characteristics of the fuel or oxidizer supplied to the burner. For example, at a given heat release level, less non-condensing products will be formed by employing a gaseous fuel having a high ratio of hydrogen to carbon, such as methane. The volume of non-condensing products can now also be reduced by employing a free-oxygen-containing gas richer in oxygen than air, for example, a mixture of oxygen and air. The volume of non-condensing combustion products formed at a given heat release level can be increased by employing a fuel having a lower hydrogen to carbon ratio, such as acetylene, or by employing a free-oxygen-containing gas of reduced oxygen content, such as air which is partially denuded of oxygen by previous combustion. The volume of non-condensing combustion products can also be controlled by adjusting the ratio of air to fuel fed to the burner. Excess air will result in increased quantities of non-condensing combustion products, while excess fuel will result in decreased quantities of non-condensing combustion products. It will be understood that the pressures in the cavity are ordinarily very high, substantially above the vapor pressure of steam at normal operating temperatures.

While the invention has been illustrated as embodying a single cavity communicated by a single well-bore through which three concentric conduit systems extend, it will be understood that the invention can be practiced employing other embodiments. In some instances it will be preferred to employ separate well-bores for the input and output solvent conduits. The burner will be disposed adjacent the input conduit terminus and fuel and air can be supplied to the burner through conduit means within the input conduit. Solvent can be removed from the subterranean formation through an output conduit in a well-bore disposed laterally of the input conduit well-bore. The distance between the two well-bores can be 100 feet or more. In such embodiments communication through the subterranean stratum is usually initially obtained by fracturing the stratum.

It will be understood that due to the high hydrostatic pressure exerted upon the brine in the subterranean formation, the brine can be heated to temperatures far in excess of the boiling point of the brine at atmospheric pressure. For example, a hydrostatic head of 1,000 feet will result in a downhole pressure of approximately 30 atmospheres. The brine can, therefore, be heated to a temperature level such that after considering all of the heat losses inherent in the dissolving of mineral from the subterranean formation and the recovery of the enriched brine at the surface of the earth, the temperature of the recovered brine will be just below the boiling point at atmospheric conditions, say 200° F. Under some conditions it may be desirable to recover the solvent at the surface of the earth under positive pressure at temperatures in excess of the boiling point of the solvent, and to cool the solvent by flash vaporization.

As a specific example of the method of this invention, a subterranean formation containing sylvite is communicated with a well-bore equipped with conduits as shown in the drawing. A small cavity is formed by the circulation of water into the formation and the recovery of brine therefrom. A downhole burner is provided as shown in the drawing and conduit means are installed to provide a mixture of gas and air to the burner. The depth of the cavity is 1,000 feet. Brine at 50° F. and a flow rate of 50 gallons per minute is circulated downward through internal conduit 14. Positive pressure is supplied to the brine at the surface of the earth, as required, by means of a pump to maintain the desired flow rate. A theoretically correct mixture of gas and air is provided to the burner at the rate of 140 standard cubic feet of natural gas per minute and 1500 cubic feet of air per minute. Combustion products are formed at the rate of about 1400 cubic feet per minute, measured at standard conditions. The actual volume of the combustion products formed, at gas cap temperature and pressure, is about 70 cubic feet per minute. The pressure in the gas cap is approximately 30 atmospheres. Gas from the gas cap is bled into external tubing string 16 and exerts gas-lift upon brine removed from the cavity at the rate of 50 gallons per minute. Due to heat exchange within the well-bore, brine entering the internal conduit at 50° F. at the surface of the earth enters the cavity at about 100° F., and is heated by means of the submerged combustion burner to a temperature of about 300° F. Brine entering the external conduit at an initial temperature of 300° F. is cooled by heat transfer to the surrounding earth and to the downcoming fresh brine and reaches the surface of the earth at a temperature of 200° F. The recovered brine is substantially saturated with potassium chloride.

It will be understood that the flow rate of the brine and the downhole temperature can be adjusted to provide a substantially saturated condition of the recovered brine at the surface of the earth. The brine is at maximum temperature in the cavity, and leaves the cavity in an enriched but less than saturated condition, as is always the case in solution mining operations. It is an advantage of the method of this invention that the maximum temperatures in the system occur downhole at the point of mineral dissolution. In this manner heat losses in the system are minimized, and the temperature of the brine when recovered at the surface of the earth is reduced below cavity temperatures, whereby a substantially saturated brine is recovered.

While the invention has been described with special emphasis upon the several preferred embodiments thereof, and has been illustrated by a specific example, it will be understood that within the scope of the appended claims the invention can be practiced otherwise than as specifically described.

The embodiments of the invention in which an exclusive property or privilege is claimed are defined as follows:

1. In the recovery of soluble minerals from a subterranean formation by circulating an unsaturated solvent downward through an input conduit having an outlet within said formation, and circulating enriched solvent upward through an output conduit having in inlet within said formation whereby soluble mineral is dissolved and a cavity is formed, the improvement comprising disposing a submerged combustion burner within said formation adjacent said outlet, providing conduit means communicating said burner with the surface of the earth, flowing fuel and a free-oxygen-containing gas downward through said conduit means to said burner, concomitantly with the circulation of said solvent burning said fuel to heat said solvent, said fuel and free-oxygen-containing gas being selected to form a volume of non-condensable combustion products, whereby said combustion products collect at the top of said cavity, and flowing said combustion products from the top of said cavity into said output conduit in admixture with said solvent, whereby a lifting force is exerted on the solvent in said output conduit.

2. The method in acccordance with claim 1 in which said free-oxygen containing gas is air and said fuel is natural gas.

3. The method in accordance with claim 2 including the step of adjusting the ratios of air to natural gas to provide a predetermined volume of non-condensable combustion products.

4. The method in accordance with claim 1 in which said input conduit and output conduit are arranged substantially concentric in a well-bore, whereby downward circulating solvent is heated by heat transferred from an upward flowing mixture of gas and solvent.

5. The method in accordance with claim 4 in which the solvent withdrawn from said output conduit at the surface of the earth is substantially saturated with said mineral.

6. The method in accordance with claim 5 in which the mineral recovered is sylvite and the solvent comprises water.

7. In a system for the recovery of soluble minerals from a subterranean cavity, fluid circulation means comprising a first conduit having an inlet within said cavity and spaced from the top thereof, a second conduit having an outlet within said cavity, a burner adapted for the submerged combustion of gaseous fuel and air positioned within said cavity adjacent said outlet and externally of said first conduit, conduit means for supplying fuel and air to said burner, all said conduits being substantially vertical, and a passage communicating the interior of said first conduit with said cavity externally of said first conduit at a point adjacent the top of said cavity and above said inlet.

8. An apparatus in accordance with claim 7 in which said first and second conduits and said conduit means extend through a single well-bore from said cavity to the surface of the earth.

9. An apparatus in accordance with claim 8 in which said second conduit lies within said first conduit.

References Cited by the Examiner

UNITED STATES PATENTS

| | | | |
|---|---|---|---|
| 1,121,225 | 12/1914 | Bradley | 299—5 |
| 1,170,266 | 2/1916 | Huff | 299—6 |
| 2,707,029 | 4/1955 | VanHartesveldt | 166—59 |
| 2,772,868 | 12/1956 | Brandt | 299—5 |
| 2,954,218 | 9/1960 | Dew et al. | 299—6 X |
| 3,115,195 | 12/1963 | Graham et al. | 175—17 |

ERNEST R. PURSER, *Primary Examiner.*